July 6, 1926.  1,591,291
F. V. DETWILER
BROILER
Filed March 21, 1924   3 Sheets-Sheet 1

Inventor
F. V. Detwiler
By C. A. Snow & Co.
Attorneys.

July 6, 1926.

F. V. DETWILER 1,591,291

BROILER

Filed March 21, 1924

F. V. Detwiler Inventor

By C. A. Snow & Co.
Attorneys

July 6, 1926.                F. V. DETWILER                1,591,291
                              BROILER
                        Filed March 21, 1924          3 Sheets-Sheet 3
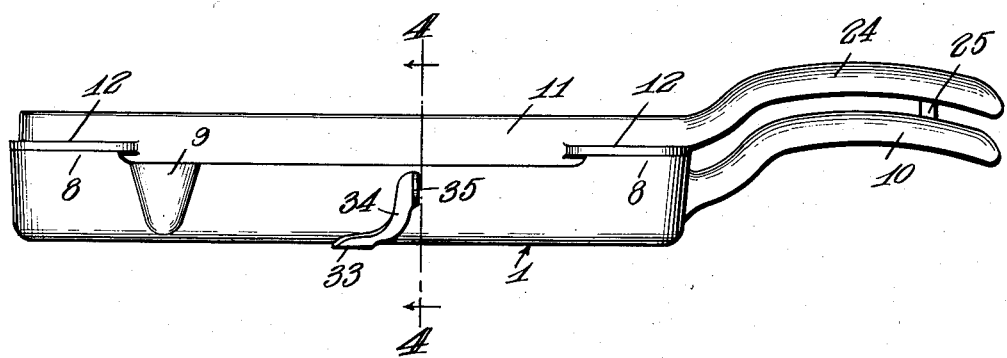
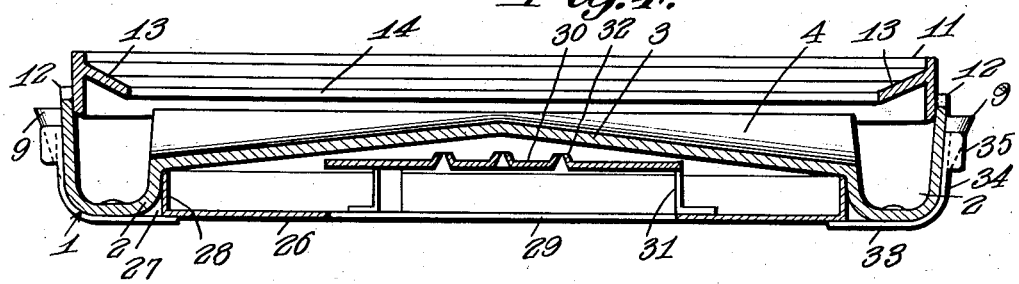
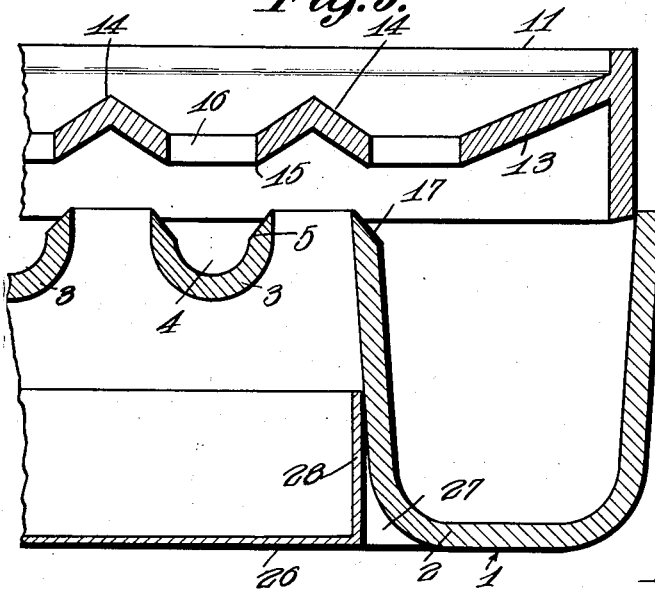
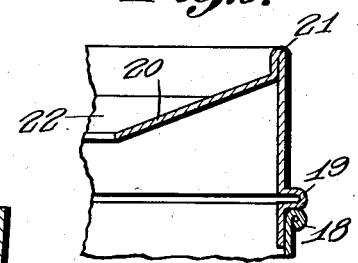
Inventor
F. V. Detwiler
By C. A. Snow & Co.
Attorneys Patented July 6, 1926.

1,591,291

UNITED STATES PATENT OFFICE.

FOREST V. DETWILER, OF POTTSTOWN, PENNSYLVANIA.

BROILER.

Application filed March 21, 1924. Serial No. 700,876.

This invention relates to broilers, one of its objects being to provide a simple and efficient utensil of this character whereby meats of all kinds can be broiled over coal, gas or oil stoves without danger of grease dripping into the fuel. Heretofore it has not been possible to broil meats over oil stoves because the fats have dripped into the fuel and produced a dangerous flame. Broilers used over gas stoves have also been objectionable because they do not prevent the grease from dripping onto the burners.

It is an object of the present invention to provide a broiler which will collect all of the grease exuding from the meat without interfering with the proper direct application of heat to the meat.

Heretofore various means have been employed for collecting grease released from meats being broiled but, owing to capillary attraction, the liquid grease has generally flowed under the meat supporting members of the broiler, and dropped off of the broiler in spite of the provision of grease collecting means. It is an object of this invention to so construct the broiler that the liquid grease cannot drop between the members of the broiler and off of the broiler but will all be properly trapped.

Another object is to provide a broiler having superposed plates, the upper plate constituting a meat supporting grid while the lower plate constitutes a combined shielding and collecting grid, there being means whereby the two plates can be easily handled independently of each other as, for example, when it is desired to overturn the broiled meat onto a dish and subsequently pour the collected juices over the meat.

Another object is to provide a broiler with which can be combined a detachable heating unit, the construction of the broiler being such that when an electric heating unit is combined therewith there will be no danger of grease dripping onto the heater and reducing its efficiency. Heretofore electric heaters have been used for broiling meats but they have been found inefficient and of little value because the greases dripping onto the heating coils become baked thereon, thereby preventing or greatly retarding radiation of heat. The removal of these hard incrustations from the coils can only be effected by the use of strong caustics which have an injurious effect upon the heating coils and cause them to burn out quickly. The present invention aims to avoid these objections by preventing the grease from dripping onto the heating unit.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred forms of the invention have been shown.

In said drawings:—

Fig. 3 is a side elevation of the complete broiler.

Fig. 4 is a section on line 4—4, Fig. 3.

Fig. 5 is an enlarged transverse section through one side portion of the broiler.

Fig. 6 is a view similar to Fig. 5 but on a reduced scale showing the construction of the members of the broiler when formed of sheet metal.

Fig. 7 is a section through portions of the superposed grids when formed of sheet metal.

Figure 1:
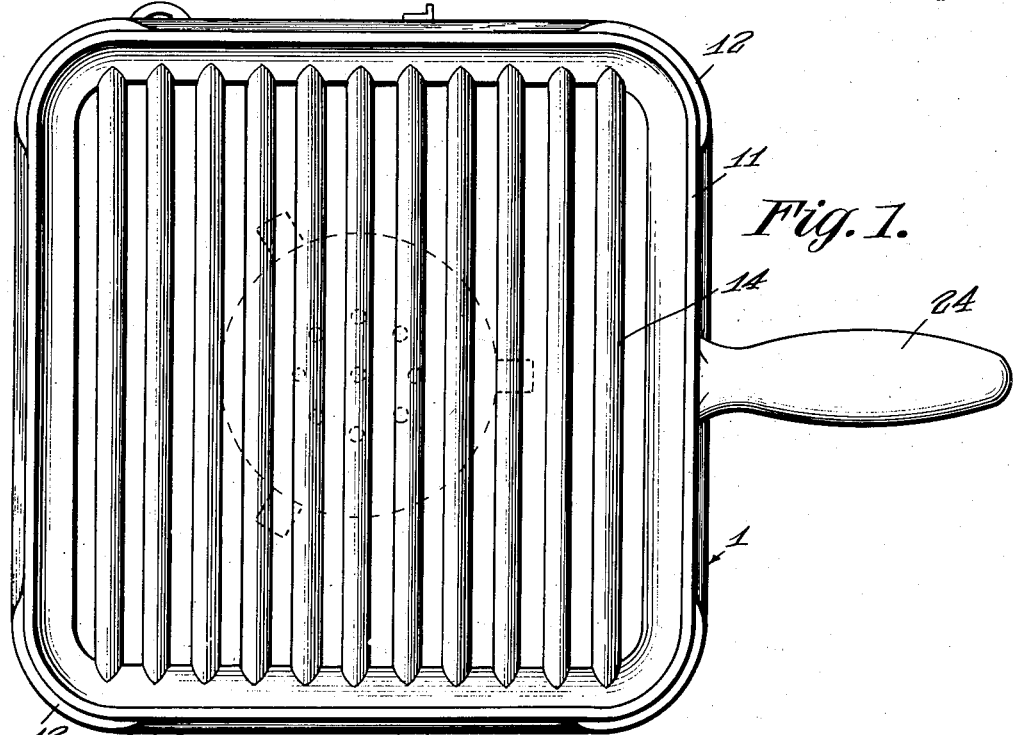
Figure 1 is a plan view of the broiler.

Referring to the figures by characters of reference 1 designates the base plate or lower grid of the broiler. This is preferably substantially rectangular and includes a marginal trough or gutter 2 the inner walls of opposed portions of which are connected by parallel bars 3. Each of these bars is channeled longitudinally as shown particularly in Figs. 4 and 5, each channel being shallow at the center of the bar 3 but increasing gradually in depth toward the ends of the bar where the channels open into the trough or gutter 2. These channels have been shown at 4 and serve to drain the exuded fats to the trough or gutter as will be apparent. If the plate 1 is cast of aluminum or other metal the inner faces of the walls of the channels 4 are flared upwardly so as to diverge as shown at 5 in Fig. 5. If, however, this bottom plate is stamped from sheet metal, as shown for example in Fig. 7, the upper portions of the walls 6 of the bars can be flared or outturned as at 7.

The outer corner portions of the trough or gutter 2 have their walls elevated slightly above the remaining portions of the walls, thus to form supporting ledges 8 and if desired, one or more of the outer walls of the trough or gutter can be formed with a pouring spout 9. A handle 10 is extended from one of the outer walls and is preferably integral with the bottom grid or plate so that the same can be easily manipulated.

The top plate or grid has been indicated generally at 11 and is of substantially the same outline as the lower grid or plate 1. It is provided, at its corner portions, with outstanding ribs 12 adapted to rest upon the supporting ledges 8. The lower edges of the wall of this upper plate or grid are adapted to extend into the space defined by the ledges 8 and to project slightly into the upper portion of the trough or gutter 2. A downwardly and inwardly inclined flange 13 is extended from the wall of the top grid or plate 11 below the upper edge thereof and opposed portions of this flange are connected by cross bars 14. These bars are parallel and are V-shaped in cross section as shown particularly in Fig. 5. The side edges of the bars are preferably perpendicular if the top grid or plate is cast. Thus the inclined bottom faces of the bars will cooperate with these edges to produce drip edges 15. The slots 16 formed between the bars 14 are narrower than the bars 3 of the lower plate or grid 1 and when the top plate is in position the bars 14 will bridge the spaces between the bars 3 and the side edges of the bars 14 will be in vertical alinement with the inner portions of the flared surfaces 5. Obviously, therefore, liquids dripping from the bars 14 will drop off at the edges 15 and fall directly into the channels 4. This lapped arrangement of the bars 3 and 14 is thus very important and importance is also attached to the fact that the bottom faces of the bars 14 are inclined upwardly from the drip edges 15 because it is thus impossible for liquids to travel by capillary attraction under the bars 14 to points where they can drip between the bars 3. As shown in Fig. 5 the drippings from the side bars 14 can flow directly into the trough or gutter 2 because the upper edge of the inner wall of this trough or gutter is inclined or flared as at 17 and terminates under the adjacent bar 14. Should the broiler be formed of sheet metal the bottom plate or grid would have its outer walls turned outwardly to provide a rib as shown at 18 in Fig. 6 and the outer walls of the upper plate or grid would be struck outwardly as at 19 to provide a ledge for resting on this rib. Furthermore the inwardly extending inclined flange 20 would be produced by folding the metal to provide an upstanding rim 21 from which the inclined flange 20 projects. The bars 22 when struck from a blank of sheet metal are integral with opposed portions of the flange 20 and are V-shaped as shown in Fig. 7, these bars having depending side edges 23 adapted to overlap the flared portions 7 of the bars 6. Consequently any liquids draining from the meat being broiled will drip onto the flared portions 7 and will not flow by capillary attraction back under the bars 22, there to be baked and produce objectionable smoke.

For the purpose of facilitating the handling of the top plate or grid 11 a handle 24 is formed integral therewith or is suitably secured thereto, this handle being so located as to overlap the handle 10. A spacing lug 25 can be provided on one of these handles so as to hold them against relative movement when the two handles are grasped in one hand. Sufficient space is left between the handles to allow the upper one to be lifted readily off of the lower handle when it is desired to move the top plate or grid from the lower plate 1.

For the purpose of spreading heat under the bars of the bottom plate 1 a plate 26 is provided for insertion into the space 27 surrounded by the trough or gutter 2 and below the bars 3. This plate has an upstanding flange 28 at its periphery and is provided with a large central opening 29. A deflecting plate 30 is located above and bridges the opening 29, the two plates being connected by ears 31 or the like located at the margin of the opening 29. Small openings 32 for the escape of heat can be provided in the deflecting plate 30. For the purpose of fastening the plate 26 within the space 27 latches or buttons 33 are pivotally connected to the bottom of the plate 1 and are adapted to extend under the marginal portions of the plate 26 at opposite sides. These latches or buttons have upwardly extending portions 34 which fit closely to the outer walls of the trough or gutter 2 and have finger pieces 35 extending outwardly therefrom. Obviously by swinging these buttons about their pivots, they can be moved from under the plate 26 and the spreading attachment thus withdrawn from the space or recess 27.

In using this broiler the deflector is fastened in the recess 27, the top plate 11 is assembled with the bottom plate 1 so that the parts will appear as in Figs. 3 and 4, and the meat to be broiled is placed on the bars 14. The broiler is placed over the flame of the cook stove and the heat passing upwardly through the opening 29 will be deflected radially. The plate 30 will be heated to a red heat and the heat radiating therefrom will rise between the central portions of the bars 3 and 14. The heat passing between the plates 26 and 30 will rise between the marginal portions of the bars 3 and 14. Thus the meat resting on bars 14 will be properly broiled and as the juices exude therefrom they will drip off of the edges 15 of bars 14 into the flared upper portions of the channels 4. Because of the pitch of these channels the juices will flow rapidly to the trough or gutter 2 where they will accumulate. Because of the rapidity of the flow of the juices they will not be dried out upon the bars before reaching the trough or gutter. Furthermore as these juices cannot flow back under the bars 3 and 14, there is no danger of the formation of carbonized deposits upon the lower faces of the bars.

The spreading element made up of the plates 26 and 30 is especially useful when the broiler is supported over the flame of an oil stove or a gas stove, as it thereby insures proper distribution of the heat to all portions of the meat. If it is not desired to use this heat distributer, the buttons or latches 33 can be swung from under plate 26 to release the plate.

After the meat has been properly broiled the top plate 11 can be lifted off of the bottom plate 1 by means of handle 24. The bottom plate can then be carried by means of handle 10 and tilted so that the liquid contents of the trough or gutter 2 can pour from one of the spouts 9. By then overturning this bottom plate the broiled meat can be deposited on a plate.

Figure 8:
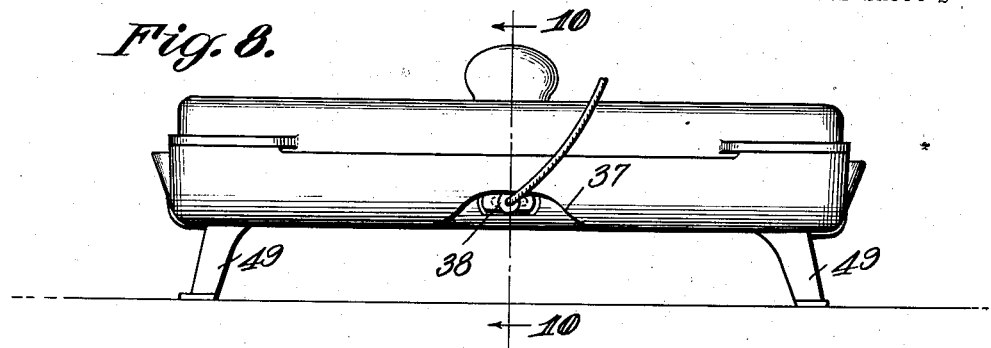
Fig. 8 is an end elevation of a modified form of broiler utilizing an electric heating unit.
Figure 9:
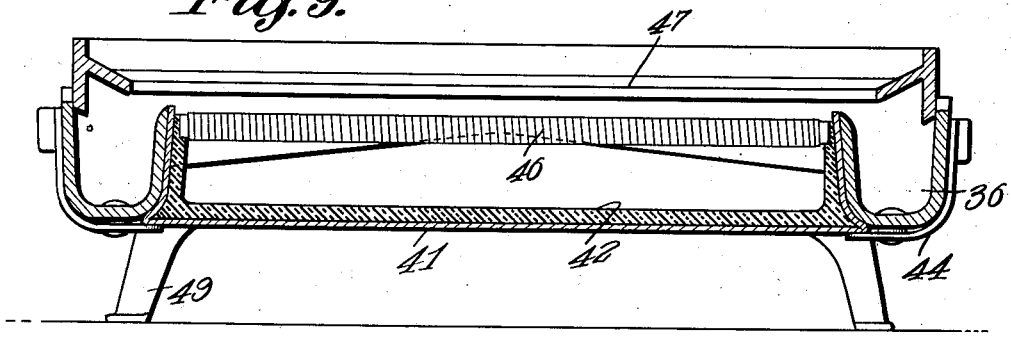
Fig. 9 is a vertical transverse section therethrough on an enlarged scale.
Figure 10:
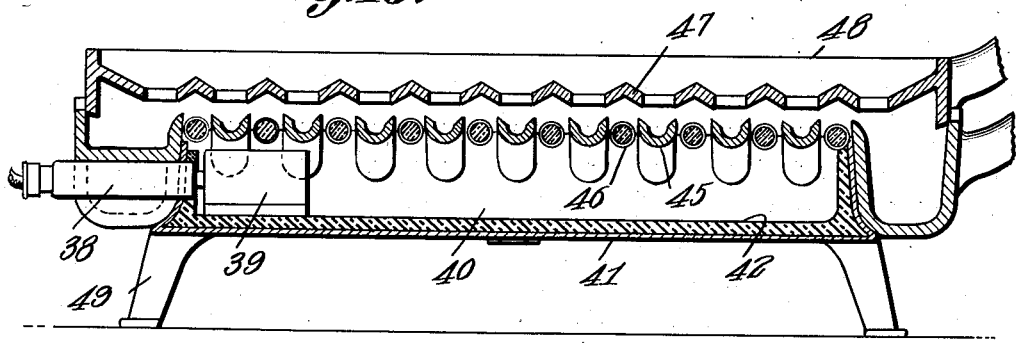
Fig. 10 is a section on line 10—10, Fig. 8, said section being on an enlarged scale.
Figure 11:
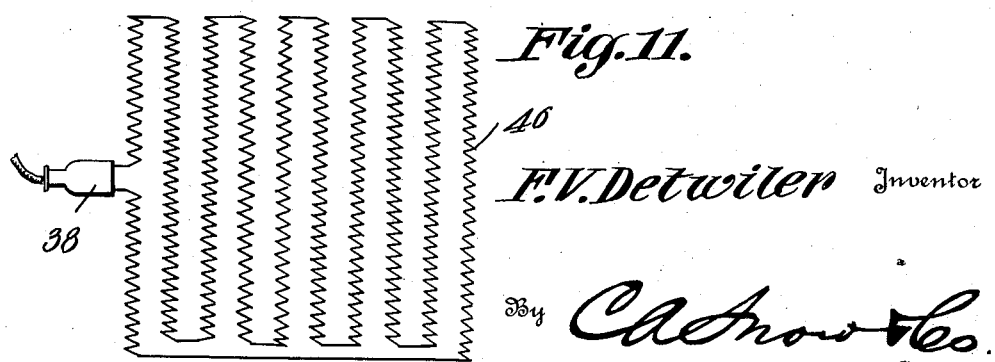
Fig. 11 is a diagrammatic plan view of the heating unit.

One of the advantages resulting from the construction of broiler herein described is the fact that the broiler can be used in connection with an electric heating unit. This combination of the broiler and heating unit has been illustrated in Figs. 8 to 11 inclusive. Where an electric heating unit is employed the gutter or trough 36 is preferably reduced at one point, as shown at 37 for the reception of a plug 38 adapted to be fitted into the socket 39 of the heating unit 40. This heating unit includes a tray 41 preferably lined with asbestos or other suitable heat insulating material indicated at 42 and the tray is adapted to fit snugly within the recess 43 corresponding with the recess 27 hereinbefore referred to. The latches or buttons 44, which are the same as the buttons 34 can be employed for fastening this tray in the recess. The tray is adapted to fit close to the bars 45 which are channeled and flared as has already been described in connection with the structure shown in Fig. 5. Heating coils 46 are extended across the tray and designed to be supported between but out of contact with the bars 45. The bars 47 of the upper plate or grid 48 are similar to the bars 14 and are adapted to bridge the coils 46 and to drain into the channeled bars 45.

Figure 2:
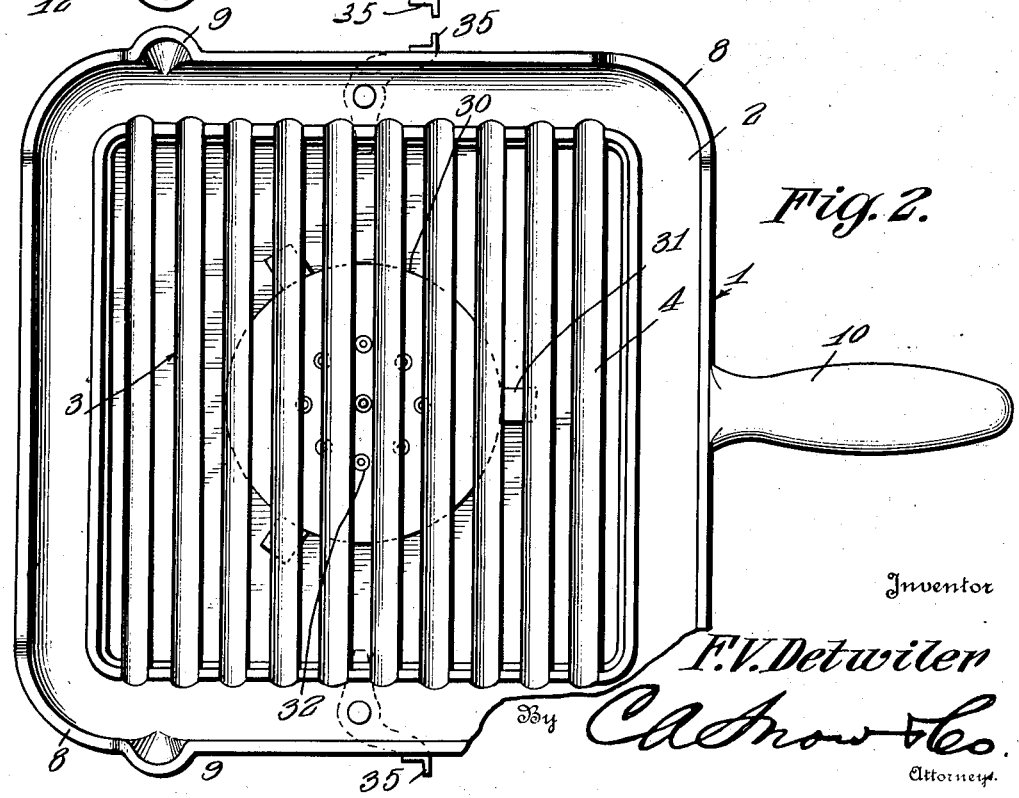
Fig. 2 is a similar view with the top grid removed.

With a structure such as shown in Figs. 8 to 11 inclusive meats can be broiled efficiently without danger of the juices dripping onto and encrusting the heating coils. The tray 41 can be supported by legs 49 and by releasing the buttons or latches 44 from the tray the two grid or broiler plates can be lifted off of the heating unit and subsequently separated as heretofore pointed out. These two plates can be provided with handles such as have already been described in connection with the structure shown in Figs. 1 to 5 inclusive.

What is claimed is:—

1. In a broiler a lower plate having a marginal trough, parallel bars extending from side to side of said plate and having channels in their upper faces, said bars being inclined downwardly from their centers toward their ends to drain the contents of the channels into the trough, an upper plate provided with corner portions and having parallel bars straight from end to end and extending along and bridging the spaces between the channeled bars of the lower plate, handles extending from the respective plates and normally superposed, upstanding ledges at the corners of the lower plate for straddling the corner portions of the upper plate, and outstanding portions of the upper plate engaging the ledges, thereby to hold the upper and lower plates in correct relative positions.

2. In a broiler a lower plate having a marginal trough, parallel bars extending from side to side of said plate and having channels in their upper faces, said bars being inclined downwardly from their centers toward their ends to drain the contents of the channels into the trough, an upper plate provided with corner portions and having parallel bars straight from end to end and extending along and bridging the spaces between the channeled bars of the lower plate, handles extending from the respective plates and normally superposed, upstanding ledges at the corners of the lower plate for straddling the corner portions of the upper plate, supporting ribs outstanding from the corner portions of the upper plate for bearing upon the ledges of the lower plate, thereby to hold the upper and lower plates in correct relative positions, the side edges of the bars of the upper and lower plates being beveled to form arcuate angles, said angles of the upper bars overhanging the channels in the bars of the lower plate.

3. In a broiler a lower plate having a marginal trough, parallel bars extending from side to side of said plate and having channels in their upper faces, said bars being inclined downwardly from their centers toward their ends to drain the contents of the channels into the trough, an upper plate provided with corner portions and having parallel bars straight from end to end and bridging and extending along the spaces between the channeled bars of the lower plate, handles extending from the respective plates and normally superposed, upstanding ledges at the corners of the lower plate for straddling the corner portions of the upper plate, and outstanding portions on the upper plate engaging the ledges, thereby to hold the upper and lower plates in correct relative positions, there being a recess within the bottom of the lower plate surrounded by the trough, a heat distributing unit detachably seated within the recess, and latches pivotally connected to the bottom of the lower plate and extending under said unit for holding the same within the recess.

In testimony that I claim the foregoing as my own, I have hereto affixed my signature.

FOREST V. DETWILER.